Figure 1:
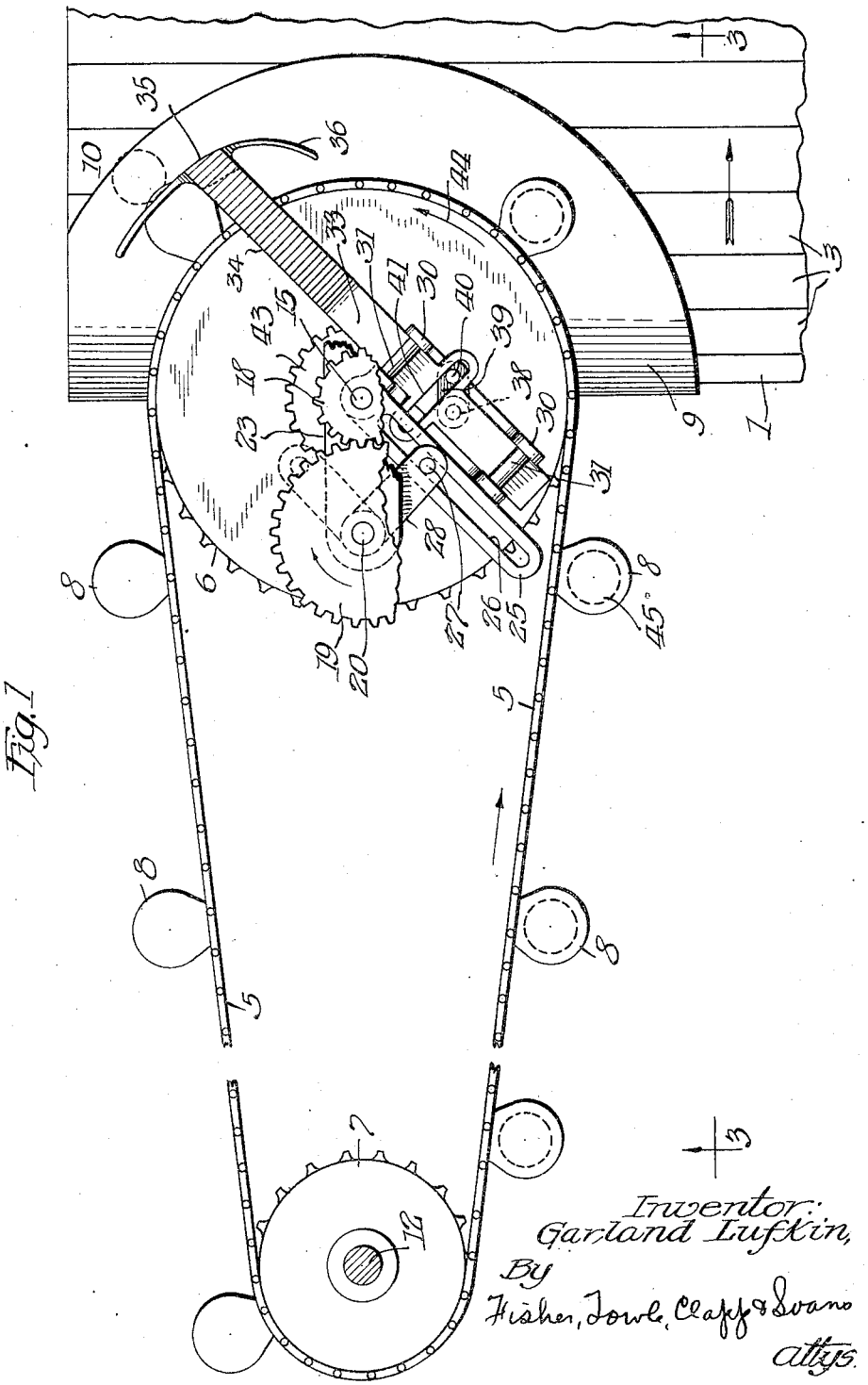

Nov. 4, 1924. 1,513,837
G. LUFKIN
CONVEYER
Filed July 21, 1921  3 Sheets-Sheet 1

Inventor:
Garland Lufkin,
By
Fisher, Fowle, Clapp & Evans
attys.

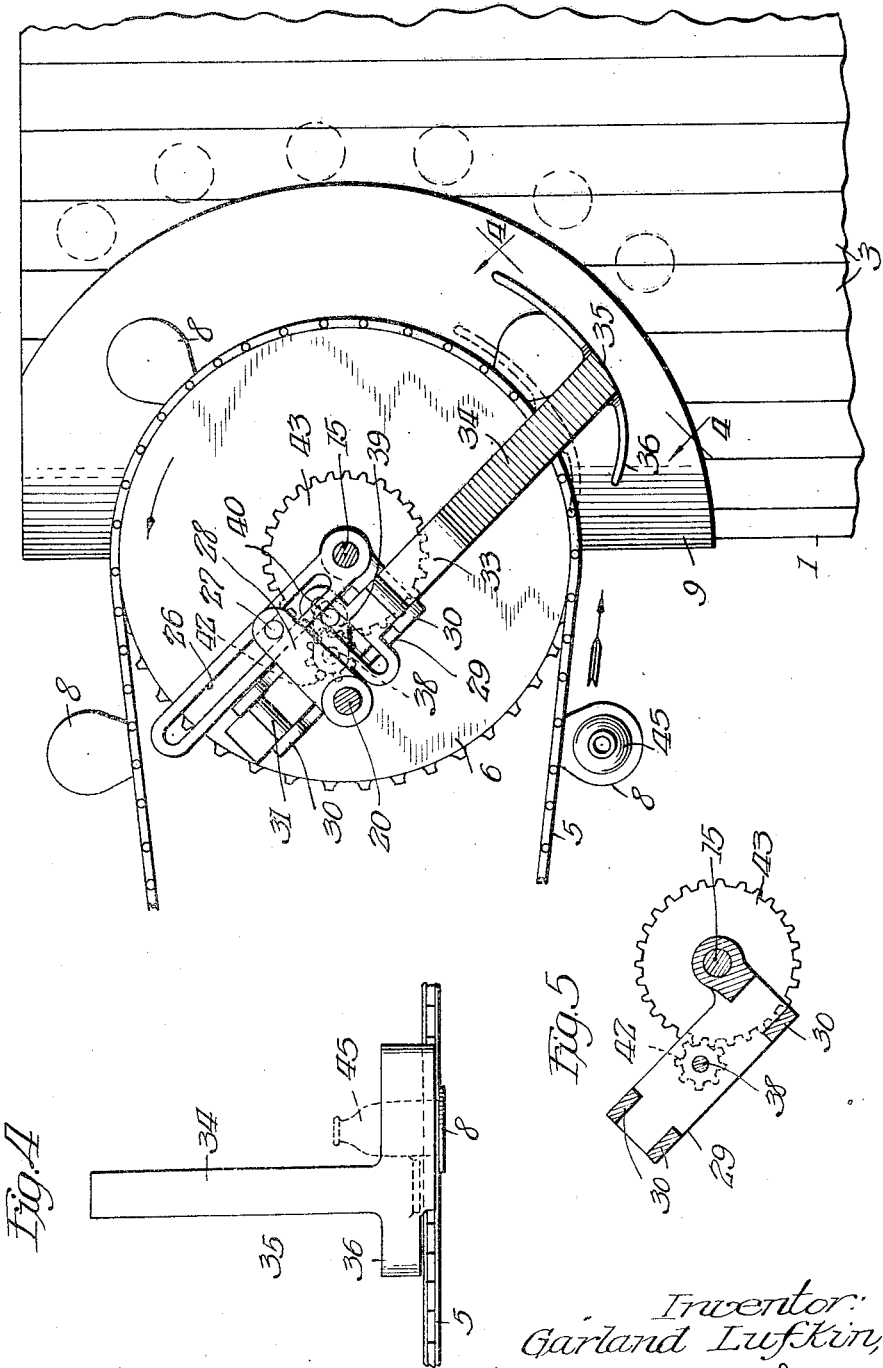

Nov. 4, 1924.
G. LUFKIN
1,513,837
CONVEYER
Filed July 21, 1921  3 Sheets-Sheet 3
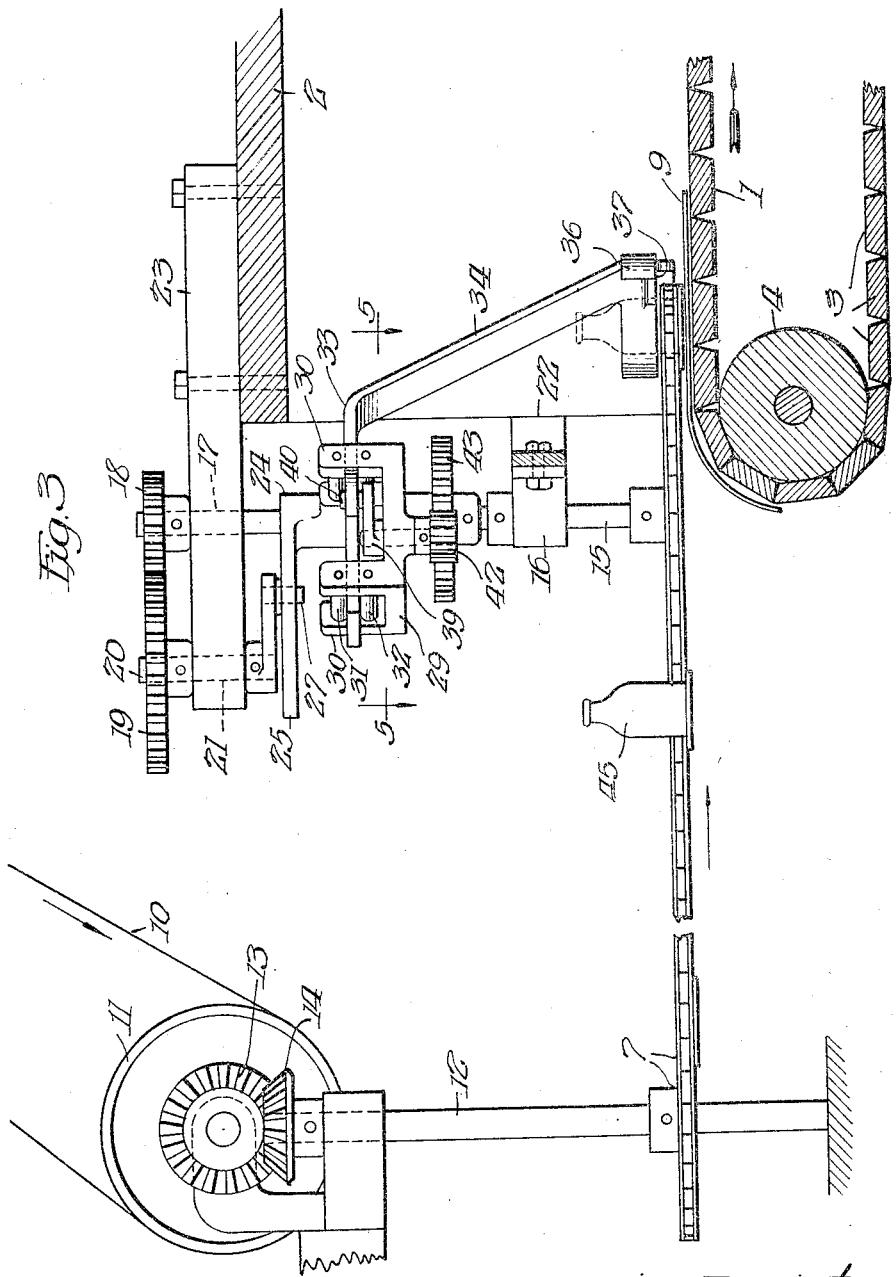
Inventor:
Garland Lufkin,
By Fisher, Fowle, Clapp & Soans
attys.

Patented Nov. 4, 1924.

1,513,837

UNITED STATES PATENT OFFICE.

GARLAND LUFKIN, OF SAND SPRINGS, OKLAHOMA, ASSIGNOR TO ALEXANDER H. KERR, OF SAND SPRINGS, OKLAHOMA.

CONVEYER.

Application filed July 21, 1921. Serial No. 486,331.

*To all whom it may concern:*

Be it known that I, GARLAND LUFKIN, a citizen of the United States, residing at Sand Springs, in the county of Tulsa and State of Oklahoma, have invented certain new and useful Improvements in Conveyers, of which the following is a specification.

My invention relates to devices for conveying articles of glass from a molding machine into a leer or annealing oven and has reference particularly to mechanism for distributing the articles onto the leer pans.

In making glass articles it is customary, after they have been formed, to pass them through an annealing oven by depositing them on a somewhat wide conveyer, which travels at a slow rate through the leer or oven, and it is desirable to distribute the articles on the leer conveyer entirely across the width thereof.

The principal objects of my invention are to provide improved mechanism for conveying and distributing jars or other glass articles on the leer conveyer; to minimize the danger of marring or checking the articles in depositing them on the leer conveyer; to provide improved ejecting mechanism for transferring the bottle from the conveyer to the leer; and in general, to provide improved mechanism of simple construction and which is effective to transfer and distribute jars or bottles onto the leer conveyer in a more satisfactory manner than heretofore.

On the drawings

Fig. 1 is a top view of a jar conveying and discharging device embodying my improvements and showing the ejector in the initial position;

Fig. 2, a similar view showing the ejector in the final position;

Fig. 3, a side view of the mechanism shown in Fig. 1 taken on the line 3—3;

Fig. 4, a front elevation of the ejector and

Fig. 5, a sectional view on the line 5—5 of Fig. 3.

Referring to the drawings the reference numeral 1 indicates the leer conveyer, which travels through the leer or annealing oven 2 in the usual manner, this conveyer being composed of a plurality of leer pans 3, which extend crosswise of the oven and are trained around pulleys or wheels 4.

Leading into the forward end of the annealing oven is a bottle or jar conveyer comprising a chain 5 which passes around a large sprocket 6 in the end of the annealing oven and another sprocket at a distance therefrom and has a plurality of bottle supports 8 in the form of paddles, which are spaced apart a distance equal to one fourth of the circumference of the sprocket 6. The remote end of the conveyer is preferably located adjacent the bottle forming machine so that as the bottles or jars are formed they may be placed on the conveyer 5 and transferred directly to the annealing oven. The sprocket 6 extends over the receiving end of the leer conveyer 1 as shown in Figs. 1, 2 and 3, so that the paddles or supports 8 move directly over a stationary shelf or shield 9 which fits over the receiving end of the conveyer 1 and is substantially semicircular, to form an apron extending radially outward beyond the path of the conveyer supports 8.

The conveyer 5 may be operated in any suitable manner as for example by a belt 10 passing around a belt wheel 11 and operating the shaft 12 through beveled gears 13 and 14, said shaft 12 being journaled in an upright position and having the sprocket 7 fixed thereon. The sprocket 6 is fixed on a shaft 15 journaled in bearings 16 and 17 carried by brackets 22 and 23 respectively on the inlet end of the oven 2 and rotates with the sprocket 7. Secured to the upper end of the shaft 15 is a small spur gear 18 meshing with a spur gear 19, which is fixed on the shaft 20 journaled in a bearing 21 at the outer end of the bracket 23, the spur gear 19 being twice as large as the spur gear 18 so that the shaft 20 makes one half a revolution while the shaft 15 is making one. Loosely mounted on the shaft 15 is a hub or sleeve 24, which has an arm 25 provided with a longitudinal slot 26 engaged by the pin 27 at the outer end of the crank arm 28 which latter is fixed on the lower end of the shaft 20. The hub 24 is formed with a bracket 29 integral therewith or fixed thereto so as to be oscillated by the slotted arm 25 and is disposed somewhat laterally from the axis of the hub 24 and provided at opposite ends with spaced upwardly extending arms 30 between which upper and lower rollers 31 and 32 are interposed so as to form a guide within which a bar 33 is arranged to reciprocate. This bar, beyond the frame 29 is bent downwardly as at 34 and formed at the lower end with a shoe 35, the lower edge of which terminates just above the upper surface of the paddles or supports 8 so that the shoe may reciprocate thereover and move the jars off of the supports onto the apron 9 and then onto the leer conveyer 1. The forward end of this shoe is curved inwardly as at 36 and cut away on the underside as at 37 so as to extend back over the sprocket 6 when the bar 33 is fully retracted, and thus insure the passage of the jars on the supports 8 at the outer side of the shoe.

For effecting reciprocatory movement of the bar 33 so as to eject the jars from the supports 8 a crank shaft 38 is journaled in the frame or bracket 29 and has a crank 39 thereon adapted to rotate between the pairs of arms 30 at opposite ends of the frame, and this crank arm has a pin 40 at the outer end, which projects into an elongated transverse slot 41 in a widened portion of the bar 33 so as to cause the bar 33 to be reciprocated by rotation of the crank shaft 38. This latter shaft has a pinion 42 fixed on the lower end and meshing with a spur gear 43 which is pinned or otherwise secured on the shaft 15 to rotate therewith, said gears being proportioned so that each revolution of the shaft 15 and gear 43 thereon causes the gear 42 and crank shaft 38 to make four complete revolutions.

In the operation of this device the arm 34 is slowly swung from the position shown in Figure 1 to the position shown in Figure 2 so as to transfer jars from the carriers 8 at spaced points across the leer conveyer 1, and is given reciprocatory movements during its passage from one side of the leer conveyer to the other so as to push the jars off of the supports 8 onto the apron 9 and then onto the leer conveyer 1. This swinging movement of the pusher bar 33 takes place while the crank arm 28 is moving from the position shown in full lines in Figure 1, to the position shown in dotted lines, which is substantially 270° and the return movement of the pusher arm from the position shown in Fig. 2 to the position shown in Fig. 1 is effected while the crank arm 28 is moving from the dotted line position in Fig. 1 to the full line position or a distance of 90°, thereby effecting the return movement quite rapidly so that the return movement of the shoe 35 precedes the advance of the next succeeding jar support 8 and positions the ejector in place to eject the jar 45 from said support 8 when the latter reaches the far side of the leer conveyer. Because of the ratio of the gears 18 and 19 two revolutions of the shaft 15 are required to cause a single revolution of the shaft 20 and as the clockwise swing of the pusher bar 33 and ejector shoe 35 takes place during a 270° movement of the shaft 20, one and one half revolutions of the shaft 15 are required to effect the clockwise swing of the pusher bar 33, while the return movement thereof is effected by a one half revolution of the shaft 15. Assuming the ejector to be in the position shown in Fig. 2 in which a jar has just been ejected it will be observed that the next one half revolution of the shaft 15 and sprocket wheel 6 will return the ejector to the position shown in Fig. 1 and at the same time the one half revolution of the sprocket 6 will bring the next support 8 upon which a jar is located to the position in front of the ejector shoe 35 so that the operation of the latter at the end of its return movement will transfer the jar therefrom. The shoe 35 then slowly swings and at the same time supports 8 with jars thereon are successively brought to a position in front of the shoe 35 which, as each jar moves to a position in front thereof, is reciprocated so as to eject the jar from the support 8.

While I have shown and described my invention in a preferred form I am aware that various changes and modifications may be made without departing from the principles of my invention.

I claim as my invention:

1. In a device of the class described the combination of leer pans, a conveyer and means for transferring articles from the conveyer to the leer pans comprising a member movable from side to side of the leer pans and reciprocable transversely of its path of movement.

2. In a device of the class described the combination of leer pans, a conveyer, and means movable back and forth along the path of the conveyer and reciprocable transversely of the path of the conveyer for transferring articles therefrom to the leer pans.

3. In a device of the class described the combination of leer pans, a conveyer, a stationary apron interposed between the leer pans and the conveyer, means on the conveyer for supporting articles independently of the apron, and an ejector for transferring articles from said means onto the apron and thereafter onto the leer pans.

4. In a device of the class described the combination of leer pans, a conveyer, an ejector movable along the path of the conveyer adjacent the leer pans and mechanism for successively reciprocating the ejector at spaced points along its path of movement so as to transfer articles from the conveyer at different points onto the leer pans.

5. In a device of the class described the combination of means for carrying articles through an annealing oven, a conveyer movable over the forward end of said means and having supports at spaced intervals for said articles, an ejector movable in a direction opposite to that of the conveyer and at a slower rate and mechanism for reciprocating said ejector across the path of movement of the conveyer as each conveyer support reaches a position adjacent thereto so as to transfer the article from the support onto the said means.

6. In a device of the class described the combination of an annealing oven having a wide carrier for moving articles slowly through the annealing oven, a wheel extending over the forward end of the carrier and having a conveyer passing therearound so as to move in a curved path across the forward end of the carrier, supports on the conveyer for articles to be passed through the annealing oven, a frame oscillatable on an axis concentric with the axis of the wheel, means for imparting slow movement of the frame in a direction opposite to that of the conveyer, an ejector mounted on said frame to reciprocate transversely of the path of the conveyer, and mechanism synchronized with the conveyer to transfer an article from each conveyer support as the latter reaches a position adjacent the ejector.

7. In a device of the class described the combination of a horizontal carrier, a vertical shaft at the end of the carrier, a sprocket on said shaft extending over the carrier and having a conveyer trained therearound, spaced supports on the conveyer, a frame concentric with said shaft, a crank operated by said shaft oscillating the frame across the carrier and an ejector on the frame movable transversely of the path of the conveyer, and a crank geared to said shaft for reciprocating the ejector.

8. In a device of the class described the combination of a horizontal carrier, a conveyer movable in a curved path over the receiving end of the carrier, an ejector, a crank synchronized with the conveyer and operable to effect a slow movement of the ejector across the receiving end of the carrier in one direction and a quick movement thereof in the reverse direction, and mechanism for reciprocating the ejector transversely of the path of the conveyer, a predetermined number of times during its slow movement over the carrier.

GARLAND LUFKIN.